United States Patent [19]
Vaughan

[11] Patent Number: 5,774,193
[45] Date of Patent: Jun. 30, 1998

[54] DIGITAL TELEVISION (HDTV) AND ANALOG TELEVISION (NTSC) BROADCAST SYSTEMS COMBINED FOR SIMULTANEOUS BROADCAST

[76] Inventor: Thomas J. Vaughan, P.O. Box 440, Rye Beach, N.H. 03871

[21] Appl. No.: 395,754

[22] Filed: Feb. 27, 1995

Related U.S. Application Data

[63] Continuation-in-part of Ser. No. 956,911, Oct. 5, 1992, abandoned.

[51] Int. Cl.$^6$ .............................. H01Q 5/00; H01P 1/213
[52] U.S. Cl. ........................ 348/723; 343/890; 333/134; 333/135; 333/202; 333/212
[58] Field of Search ..................................... 333/117, 126, 333/129, 132, 134, 135, 202, 212; 343/890, 891; 348/723, 608, 487, 470, 426, 21; 370/37, 38, 297, 308; 455/119, 129

[56] References Cited

U.S. PATENT DOCUMENTS

| | | | |
|---|---|---|---|
| 2,853,681 | 9/1958 | Smoll ........................................ | 333/132 |
| 5,291,290 | 3/1994 | Vaughan et al. ......................... | 348/723 |
| 5,418,506 | 5/1995 | Mahnad ................................... | 333/134 |

*Primary Examiner*—Benny T. Lee
*Attorney, Agent, or Firm*—Robert T. Dunn, Esq.

[57] ABSTRACT

An HDTV broadcast transmission system and an analog NTSC broadcast transmission system are carried on the same tower and broadcast to the same area by adaptation of both systems: the NTSC system including: (a) a source of analog NTSC video signals, (b) an NTSC analog video signal exciter producing NTSC IF modulated analog video signals, (c) an NTSC frequency up converter and power amplifier producing NTSC RF modulated analog video signals (NTSC RF signals), (d) an NTSC broadcast antenna and (e) an all band VHF and UHF signal transmission line having an input end and an output end; the HDTV system including: (1) a source of digital video signals, (2) a digital video signal encoder producing IF modulated digital video signals and (3) a frequency up converter and power amplifier producing RF modulated digital video signals (HDTV RF signals) and an HDTV broadcast antenna; by combining the HDTV RF signals and NTSC RF signals at the input end of the transmission line and separating them at the output end and feeding them to the NTSC antenna and the HDTV antenna, respectively. In a preferred embodiment, the HDTV antenna is supported on the tower below the NTSC antenna and the antennas radiation patterns cover substantially overlapping broadcast reception areas around the tower.

22 Claims, 6 Drawing Sheets

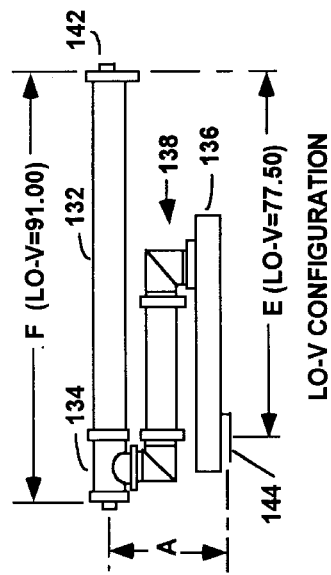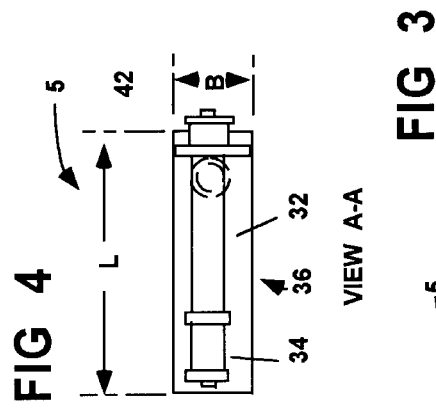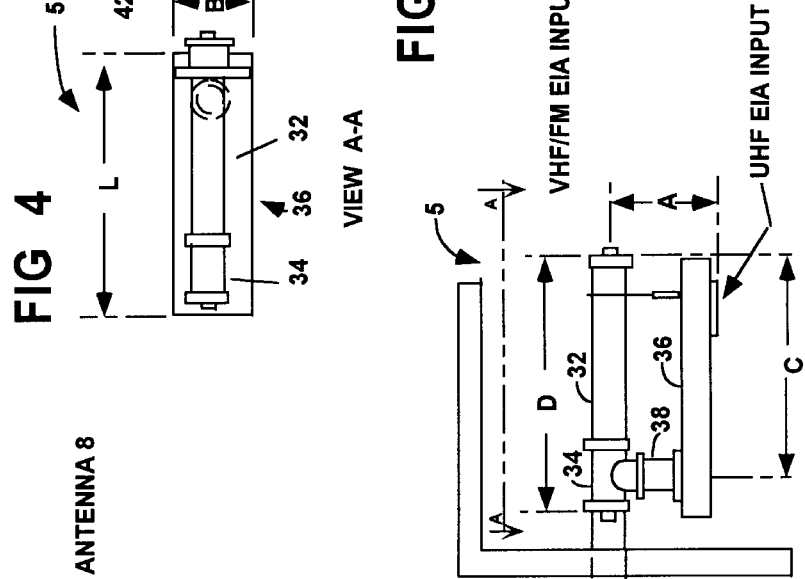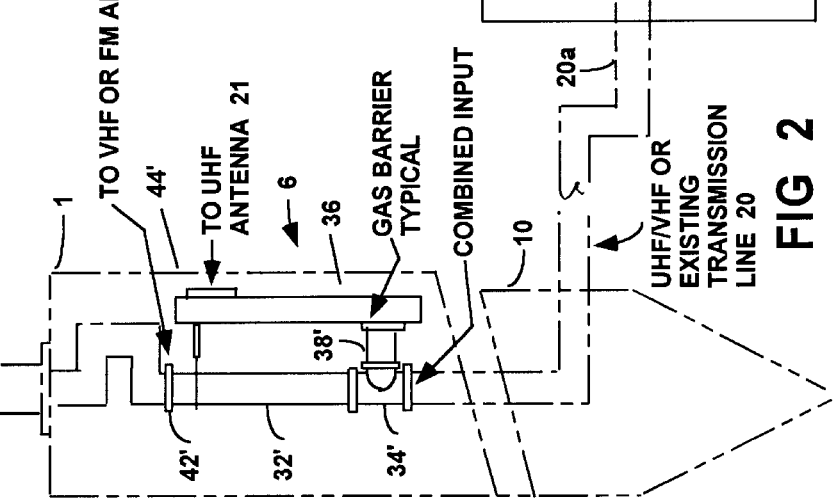

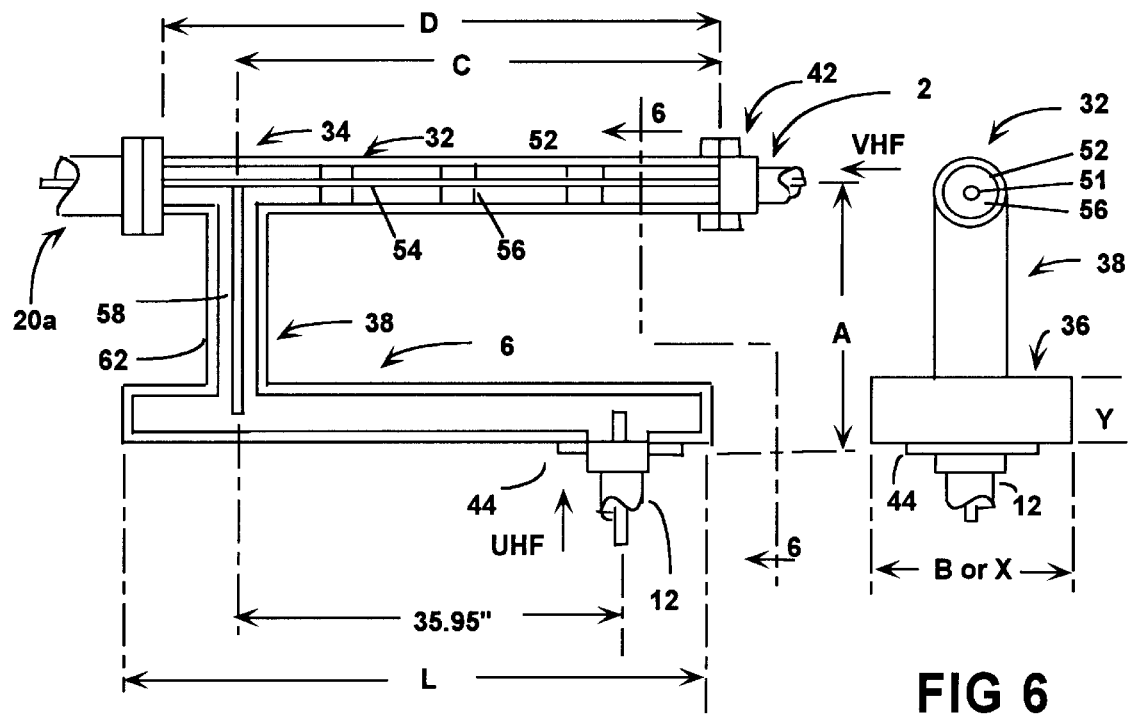
FIG 5
FIG 6
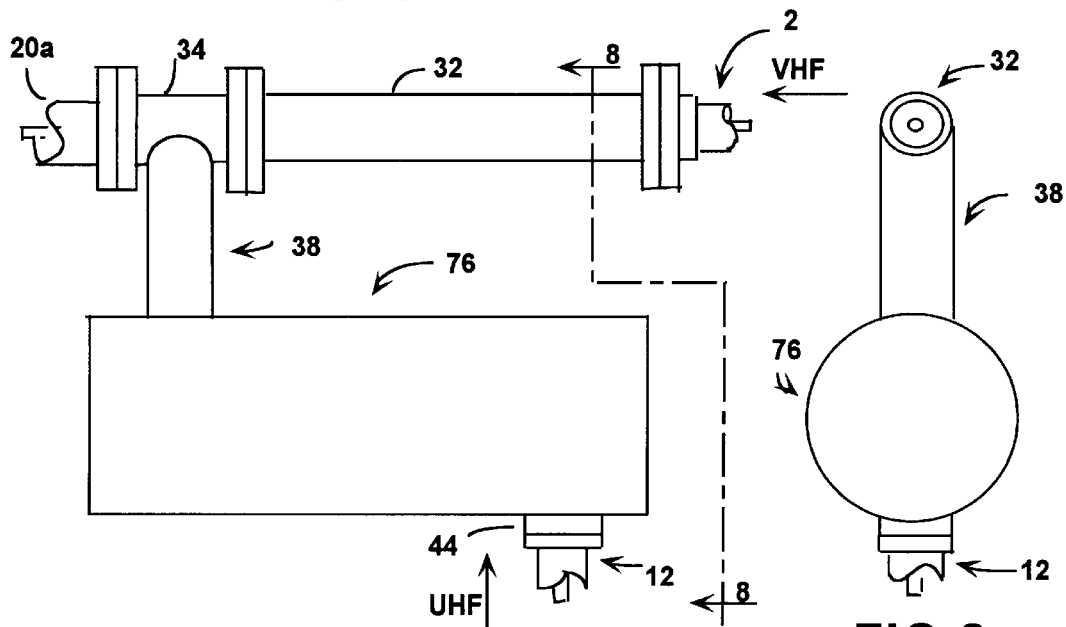
FIG 7
FIG 8

DIGITAL TELEVISION (HDTV) AND ANALOG TELEVISION (NTSC) BROADCAST SYSTEMS COMBINED FOR SIMULTANEOUS BROADCAST

BACKGROUND OF THE INVENTION

This is a Continuation-In-Part of the applicant's abandoned U.S. patent application Ser. No. 07/956,911, filed Oct. 5, 1992 abn and entitled "High Definition Television Broadcast System". The present invention relates to high power broadcast systems for broadcasting two channels of substantially different radio frequency (RF) where the channel broadcast antennas are on the same support and fed by a common transmission line. The invention has particular application to television broadcast systems for simultaneously broadcasting digital high definition television (HDTV) and analog national television standard code (NTSC) signals, as will be required in the United States by the Federal Communication Commission (FCC).

The HDTV market is projected to be very large. If every NTSC television broadcast station (broadcaster) has to supplement it's existing NTSC transmitter, tower, transmission line and antenna with an HDTV system, the total cost throughout the United States will be over two billion dollars. This does not consider the cost and time it would take to find a new tower site. In addition, it is estimated that it will cost over twice that amount for HDTV cameras, video switches and a means of getting the signal from the studio to the HDTV broadcast site.

Simulcast Period

The new Advance TV Service is referred to as high definition television (HDTV). This new service will be a digital system, have improved video, be interactive and more useful with multiple audio and data inputs. All operating NTSC broadcast full service stations will be given first preference to the new HDTV channels. The present low power NTSC broadcast stations, sometimes called LPTV stations, will have second preference to the new HDTV channels. There are at present over 1,300 full service NTSC stations and over 1,200 low power television (LPTV) NTSC stations. Studies show that if the spacing between co-channel stations were reduced, all of the existing VHF and UHF broadcast station's new HDTV broadcast channels can be accommodated in the UHF band.

Because of the "Robustness" of digital transmission, a higher quality video signal can be delivered over the same geographical audience viewing area as presently reached by NTSC broadcasts, with less than 10% of the present NTSC power. However, the new HDTV signal that is proposed is not compatible with present day NTSC receivers.

It is expected that each full service station will broadcast the same program simultaneously on an NTSC channel and on an HDTV channel. In other words, a program that is presently broadcast by NTSC signal will also be broadcast by HDTV signal over a new UHF channel that is to be allotted to the station. This Simulcast Period may last 15 years, or until there are sufficient HDTV receivers in the station's viewing area to allow the station to broadcast only over the HDTV channel.

A plan proposed by the FCC is to allow a three year period for each station to apply for an HDTV channel license and an additional two years for construction. Thereafter, the station will transmit the NTSC program and the HDTV program for a period of up to 15 years, or until all of the NTSC receivers are replaced with HDTV receivers. The applicant has concluded that each broadcast station should and will try to use its present facility for the HDTV broadcast. Although many NTSC antenna towers are wind load limited, it will be possible in many cases to re-enforce the tower so that it can also carry the HDTV transmission line and/or antenna.

Present Proposed Digital HDTV Systems

Several of the digital HDTV systems and their proponents are:

Digicipher
HDTV System
General Instruments
MIT
DSC
(Digital Spectrum Comparable) HDTV System
Zenith
AT & T
ADTV
(Advance Digital TV) HDTV System
David Sarnoff Research Ct. (Sri)
Philips
Thomson
NBC
Compression Labs These digital HDTV systems are all referred to herein as HDTV systems and the term HDTV as used herein refers only to digital HDTV. The Digicipher, DSC and ADTV HDTV systems have been tested and tests continue. Zenith and Thomson have both announced that they will have receivers ready for whichever system is selected and will be in full production the next year.

The applicant has proposed that a broadcast station's new digital HDTV broadcast transmission system and existing analog NTSC broadcast transmission system, that broadcast to the same area during the Simulcast Period, be carried on the same tower. The applicant's proposal is described in his above mentioned abandoned U.S. patent application Ser. No. 07/956,911, from which the present application is a Continuation-In-Part. Furthermore, in the applicant's pending U.S. patent application Ser. No. 08/293,429, filed Aug. 19, 1994, entitled "Digital Television (HDTV) And Analog Television (NTSC) Broadcast Systems On A Common Tower For Simultaneous Broadcast", which is a Continuation Application of said abandoned U.S. patent application Ser. No. 07/956,911, the applicant proposes that the HDTV antenna be below the NTSC antenna on the tower and be a wrap around-type, multi-element antenna, comprised of a multitude of panels spaced around the tower.

In said abandoned U.S. application Ser. No. 07/956,911, the applicant also proposes combining the HDTV and NTSC radio frequency (RF) signals and feeding them to a common wide band transmission line that goes up the tower to a common wide band (all band) antenna that broadcasts both HDTV and NTSC RF to the station broadcast area. The major differences between the HDTV and the NTSC systems are:

The NTSC system quality is a function of signal level; the stronger the signal, the better the quality.

The HDTV system signal quality, like all digital transmission, is not a function of signal level. When the signal is too low, it will disappear, hence, the so called "Cliff Effect".

Comparable signal levels based on 50/50 and 50/90 propagation curves are as follows:

For the NTSC system it is 74 db—Grade A; and

For the HDTV system it is 44 db—Equivalent Grade A. The difference is based in part on improved receiver performance, high gain receiver antennas and lower loss transmission line compared to what was used in 1952 when the original NTSC contour curves were developed. Surveys of 1,100 TV stations reveal that it is preferred that the HDTV transmitter be in the existing NTSC transmitter room and the HDTV antenna be on the existing NTSC tower.

Using a common transmission line for the NTSC and the HDTV transmission systems eliminates many wind load problems and raises new problems. First the NTSC and HDTV channel power must be combined and fed to the common transmission line. In said abandoned U.S. application Ser. No. 07/956,911 different types of channel combiners are proposed including: Constant Impedance Combiners and Star-Point Combiners.

The present invention proposes combining the HDTV and NTSC broadcast systems on a common tower with a common wide band transmission line, but separate broadcast antennas. In some situations, the applicant proposes that this can be done in compliance with all FCC guide lines and regulations and the other considerations for the existing full service NTSC or LPTV (NTSC) stations, using the existing tower, transmission line and NTSC broadcast antenna. The present invention also has application for many broadcast systems where two channels of substantially different RF are broadcast from different antennas, fed by a common transmission line, all on a common tower.

Other Television Services

Television broadcast translators and low-power television (LPTV) stations operate under Subpart G of Part 74 of the FCC Rules. A television broadcast translator is a station that re-broadcasts the programming of a broadcast station in an essentially unaltered form. The signals from the originating station may be delivered by direct off-air pickup, microwave relay, satellite transmission, or re-broadcast of another translator. An LPTV station is similar to a translator station in terms of equipment and service area, but it is permitted to originate programming from virtually any source. The technical rules governing translators and LPTV are essentially identical.

For VHF stations, the transmitter output power (peak visual) may be up to 10 watts unless the station operates on an unoccupied channel assigned to its community for regular television broadcast use; in this case, 100 watts may be employed. A UHF station may be authorized on any channel with transmitter power up to 1 kW. There is no limitation on effective radiated power for either type of station.

The technical standards for operation of these stations are generally the same as those for broadcast stations, with the principal exceptions relating to carrier-frequency tolerances, spurious emissions, and lower-sideband attenuation characteristics.

Channel assignments are made on the assumption that these facilities are secondary to broadcast stations and must protect existing facilities from objectionable interference. While the service area of a regular broadcast station is defined as the area within the predicted Grade B contour, the service area of an LPTV station is much smaller and generally equivalent to the area within its Grade A contour. Existing LPTV stations are protected from interference from newly proposed LPTV stations.

SUMMARY OF THE INVENTION

As stated above, the present invention has application to many broadcast systems where two channels of substantially different RF signals are broadcast from different antennas, fed by a common transmission line. Particular embodiments described herein disclose method and means of providing the new HDTV broadcast transmission system in compliance with FCC guide lines and regulations and the other considerations described herein for the existing full service and LPTV broadcast NTSC stations; and these efforts follow one or more of the following guide lines:

The station should use its present NTSC tower, or other support, for HDTV;

The present top mounted NTSC antenna should stay.

The new HDTV transmitter power level will be 10% to 30% as great as the present NTSC transmitter power level;

The HDTV transmission system must be an "Integrated" system, that is: it should include the HDTV transmitter, filter, transmission line and antenna as a total HDTV system integrated on the tower with the existing total NTSC system.

Clearly, it is not obvious how to achieve these guide lines and add an HDTV channel broadcast system, where the RF signals is in the Ultra High Frequency Band (UHF), to an existing NTSC channel broadcast system, particularly where the RF for NTSC Channels 2 to 13 is in the Very High Frequency Band (VHF), using a common transmission line, (preferably the existing NTSC transmission line) and the existing NTSC transmitter and broadcast antenna.

It is a general object of the present invention to provide a transmission system for two broadcast channels on the same tower using a common transmission line and different broadcast antennas.

It is a particular object to provide an HDTV transmission system for an existing NTSC tower that carries an operating NTSC transmission system.

It is another object of the present inventions to provide an HDTV broadcast system at a typical broadcast NTSC station that complies with all of the above and can be implemented with only minor revisions to the existing station NTSC system.

It is another object to provide such an HDTV transmission system for an existing NTSC transmission system and tower that carries an operating NTSC transmission system in which the existing NTSC antenna is top mounted and remains top mounted.

It is a further object to provide such an HDTV transmission system for an existing NTSC transmission system and tower in which HDTV broadcast antenna is below the NTSC antenna.

It is a further object to provide such an HDTV transmission system for an existing NTSC transmission system and tower in which HDTV broadcast antenna is side mounted or wrapped around the tower.

It is a further object to provide such an HDTV transmission system for an existing NTSC transmission system and tower, so designed and configured that it includes the HDTV transmitter, filter, transmission line, antenna and the existing tower as a total HDTV system that is integrated on the Tower with the existing total NTSC system.

Features of the several inventions described herein, all relating to the HDTV broadcast transmission system, are briefly as set forth below.

HDTV Antenna On Same Tower With Existing NTSC Antenna Using Common Transmission Line According to the present invention, a digital HDTV broadcast transmission system and an analog NTSC broadcast transmission system are carried on the same tower and broadcast to the same area by adaptation of both systems. The NTSC system includes: (a) a source of analog NTSC video signals, (b) an NTSC analog video signal exciter producing NTSC IF modulated analog video signals, (c) an NTSC frequency up converter and power amplifier producing NTSC RF modulated analog video signals (NTSC RF signals), (d) an NTSC broadcast antenna and (e) an all band VHF and UHF signal transmission line having an input end and an output end. The HDTV system includes: (1) a source of digital video signals, (2) a digital video signal encoder producing IF modulated digital video signals and (3) a frequency up converter and power amplifier producing RF modulated digital video signals (HDTV RF signals) and an HDTV broadcast antenna. The HDTV RF signals and NTSC RF signals are combined at the input end of the transmission line and separated at the output end and fed to the HDTV antenna and the NTSC antenna, respectively. In a preferred embodiment, the HDTV antenna is supported on the tower with the NTSC antenna and the antennas radiation patterns cover substantially overlapping broadcast reception areas around the tower.

The method and means of combining the HDTV RF and NTSC RF permits the two independent RF signals to be carried by one coaxial transmission line. The combined RF signal bands, one substantially lower in frequency than the other, are launched into the coaxial transmission line at the transmitter end by the combining means and are removed and separated at the antenna end of the transmission line by separating means.

In the first embodiment described herein, the combining means and the separating means are reciprocal devices and so in some cases can be identical. In that case the combining device is called a combiner and the other is called a separator.

FIRST EMBODIMENT

Two Channel Band Line Couplers For Combining And separating

According to the first embodiment herein, the combining means and the separating means are each a novel two channel line coupler. Each of these two channel line couplers consists of two filters joined together at a common junction. The filters are designed so that they separate the HDTV RF and NTSC RF without the use of highly tuned components as sometimes required in diplexers and multiplexers. One filter passes low frequencies including the NTSC RF and rejects high frequencies including the HDTV RF and so is a lowpass type. The other filter passes high frequencies including the HDTV RF and rejects low frequencies including the NTSC RF and so is a highpass type. When coupled at a junction with the proper lengths of line in between, high levels of isolation can be maintained between the two filters.

The filters can be of various designs as long as their characteristics are lowpass and highpass respectively. One version of the coupler uses a section of coaxial line as a lowpass filter for the lower frequency NTSC RF and utilizes a short section of waveguide as a highpass filter for the higher frequency HDTV RF. Waveguide is used as the highpass filter due to it's unique property of not propagating frequencies below a certain cut-off frequency. This cut-off frequency is determined only by the dimensions of the waveguide. Thus, a highpass filter can be made from a short length of waveguide line. No other tuned element is needed.

Such a two channel band line coupler can be used to couple two separate transmitters to one broad band transmission line, in which case it is called a two channel band line combiner. In this first embodiment herein, two such coupler devices enable adding an HDTV broadcasting system (with it's associated UHF antennas and transmitter) to an existing lower frequency broadcast system, such as an NTSC or FM Channel that includes a coaxial transmission line and antenna system operating in VHF or the low end of UHF. Using two such two channel band line couplers, one as a combiner at the bottom of the tower and the other as a separator at the top of the tower, as described herein, holds to a minimum the additional wind and weight loading on the existing tower.

SECOND EMBODIMENT

Combining With Diplexer Protected By Circulator

Constant impedance combiners that use a combination of bandpass or reject filters with hybrid coupling circuits to do the combining are known in the art. Such combiners are described fully in said abandoned U.S. patent application Ser. No. 07/956,911 of which the present application is a Continuation-In-Part. A hybrid combiner that uses reject filters is also described in the applicant's U.S. Pat. No. 5,291,290 issued Mar. 1, 1994, entitled "High Power Broadcast Transmission System With Ferrite Circulator" and is also described earlier in the applicant's U.S. Pat. No. 4,240,155 issued Dec. 16, 1980, entitled "Diplexer And Multiplexer".

The said U.S. Pat. No. 5,291,290 describes a high power system for combining a relatively high power TV broadcast signal (NTSC RF) with a lower power higher frequency TV broadcast signal (HDTV RF) and feeding the combined RF signals to a common transmission line that feeds a common antenna that is on top of a tower a thousand or more feet high. The NTSC RF and the HDTV RF transmitters are protected in this high power system by a special high power Y-junction three port ferrite circulator that is electrically between the diplexer and the transmission line input. One port of the circulator feeds a non-reflective RF absorbing load that takes out reflections of either RF from the antennas so that they do not enter the diplexer and then the transmitters. Clearly, the diplexer, circulator and absorbing load are at the bottom of the tower.

Using such a diplexer, circulator and absorbing load in this second embodiment of the present invention, the high power NTSC RF and the lower power HDTV RF are combined in the diplexer and fed through the high power circulator to the input end (transmitter end) of the common transmission line. At the output end (antenna end) of the transmission line an RF band separator is used to separate the HDTV RF and NTSC RF and feed them to their respective antennas for broadcast. The separator may be a two channe band line coupler separator as in the first embodiment.

BRIEF DESCRIPTION OF THE DRAWINGS

FIG. 2 is an elevation view of the common transmission line with identical channel band line couplers at the transmitter end and the broadcast antenna end of the line for the structure of FIG. 1;

FIG. 3 is a top view of the channel band line coupler at the transmitter end of the common transmission line of FIG. 2;

FIG. 4 is an elevation view of a channel band line coupler at the transmitter end of the transmission line for a combined low power television broadcast system (LPTV) and an NTSC broadcast system;

FIGS. 5 and 6 are side cross-section and end views, respectively, of the channel band line coupler of FIG. 2 having a rectangular cross-section waveguide section as the highpass filter;

FIGS. 7 and 8 are side and end views, respectively, of the channel band line coupler of FIG. 2 having a circular cross-section waveguide section as the highpass filter;

DESCRIPTION OF EMBIBODIMENTS OF THE INVENTION

Existing NTSC Broadcasting System

It is important during the simulcast period that the viewers see the NTSC and HDTV program with the same "quality". For this to occur, the "foot print" or viewing area for the new HDTV antenna must be the same footprint as the existing NTSC antenna.

The FCC has recommended that the same site be used. The likelihood of installing the HDTV antenna on the existing tower will depend on the Effective Radiating Power (ERP) allowed and the capacity of the tower to handle new transmission lines and antennas. Most towers are 1,000 feet or more in height and are stress limited by the transmission line, rather than by the antenna carried by the tower. The stress developed in the tower legs due to the transmission line is as much as five times greater than the leg stress due to the antenna.

The transmission line and antenna selected for HDTV depends on a trade off between transmit power and antenna gain. It may be assumed that all full service HDTV stations will have an ERP of 250 kW and be in the UHF band. In the applicant's above mentioned abandoned U.S. patent applications Ser. No. 07/956,911 and pending U.S. patent application Ser. No. 08/293,429 the applicant proposes that: the antenna be side mounted or be a wrap around multi-element antenna, the transmission line be small in size and the HDTV antenna be as low on the tower as possible to reduce the stresses of wind load.

HDTV Signal

The digital HDTV signal quality is not a function of distance and signal level. A quality HDTV signal will be received until the signal to noise (S/N) ratio gets too low, at that point the signal will go from a quality signal to no signal. The FCC is setting limits on ERP, they will be 10 dB to 15 dB (or more) below the NTSC limits.

Figure 11:
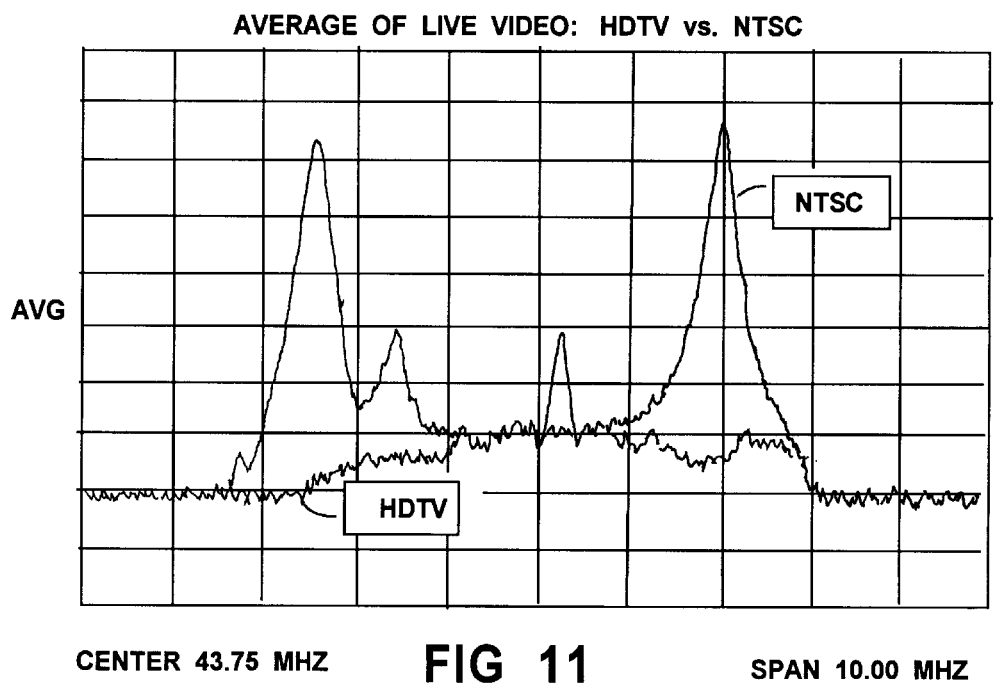
FIG. 11 is a graph of frequency characteristics of typical NTSC and HDTV video signals within the 6 MHz bandwidth of a TV broadcast channel.

FIG. 11 shows "Average Of Live Video: HDTV vs NTSC". Here the ordinate is the average power of typical video (analog NTSC or digital HDTV) and the abscissa is frequency of the same, over a total span of 10MHz, which clearly includes the conventional 6MHz channel band. The NTSC, as expected, displays high power peaks at the edges of the channel band. However, the HDTV is relatively flat over the entire channel band.

Antenna, Transmission Line And Wind Load

The applicant's studies show that for high power UHF installations, the stress developed in the tower legs due to the wind load on a waveguide transmission line can be significant.

With an HDTV panel antenna face mounted at lower levels of the tower, tower modification and strengthening will be economical and permit the broadcaster to get on the air with the HDTV signal in a reasonable period of time.

To reduce the wind load on the tower, a high gain (relatively large size) antenna and a small size (relatively high impedance) transmission line are used, rather than a low gain antenna (small size) and a large size (relatively low impedance) transmission line. The relatively small size (small cross-section) transmission line may cause more RF loss for the higher RF HDTV, but that problem is mitigated by the lower power requirement of the HDTV ERP.

The transmission line proposed herein for the combined HDTV and NTSC systems is a rigid or semi-rigid coaxial line. Waveguide has too high a wind area and is electrically dispersive, that is, it has a significant group delay over the 6 MHz of a channel band. This would raise problems for the HDTV signal, which is sensitive to group delay, whereas NTSC is not.

As mentioned above, the stress developed in the tower structural members is more dependent on the wind load of the transmission line than the antenna. In some installations, the stress developed due to the transmission line is as much as five times that due to the antenna. For this reason, the combination of a high gain antenna that has relatively high wind load with a small diameter, all-band transmission line is proposed by the applicant, even though the transmission RF loss is greater than with waveguide transmission line.

Transmission Line

Having considered all types and sizes of transmission lines and their advantages and disadvantages including electrical performance and costs (some of which are mentioned above), the applicant has determined that the common transmission line for combined HDTV and NTSC transmission should be either coaxial or helix-type coaxial line, and preferably the existing NTSC transmission line if it is coaxial. This determination is arrived at even though almost all of the HDTV channels will be UHF. The applicant concludes that waveguide transmission line should be avoided because:

The tower is probably already wind load limited. The stress developed in the tower legs due to the large size of waveguide is three to five times greater than the largest antenna at or near the tower top.

Waveguide is band limited e.g. three waveguide size (WR1800, WR1500 and WR1150) are necessary to cover the full UHF band. Unless the assigned channels in a given market are very close, one transmission line could not be used for a multi-channel installation.

Waveguide is dispersive and therefore has group delay variation over 6 MHz band.

The periodicity of flange reflection, either coax or waveguide on tall towers, will result in reflection and large group delay at channels where reflections are in phase.

Semi-rigid, helix-type coaxial line is the preferred choice because:

It has low wind load

With no flange reflections, the broad band properties of this coaxial line can be preserved for multi-channel application, particularly since the HDTV channel assignments may not be known for a number of years.

With the elimination of the anchor connector that is used in rigid line, the reliability of this type of line is increased and the failure due to peak voltage gradients is decreased.

FIRST EMBODIMENT

Two Channel Band Line Coupler For Combining And Separating

This coupler allow two independent RF signals to be carried by one coaxial transmission line. The RF signals, one lower in frequency than the other, are inserted into the coaxial transmission line at the transmitting end by means of one coupler and are removed and separated at antenna end of the transmission line by means of another identical coupler.

Each coupler consists of two filters whose outputs are joined together at a common junction that feeds the transmission line. The filters are designed such that they separate the two frequency bands without the use of highly tuned components, as required in diplexers and multiplexers.

The coupler filters are chosen to operate over a broad range of frequencies. One filter passes low frequencies and rejects high frequencies, and so is a lowpass type. The other filter passes high frequencies and rejects lower frequencies, and so is a highpass type. When combined at the junction with the proper lengths of line in between, high levels of isolation can be maintained between the two inputs.

The filters can be of various designs as long as their characteristics are lowpass and highpass respectively. One version of the coupler described herein uses a section of stepped impedance coaxial line lowpass filter for the lower frequency input and a short section of waveguide as a highpass filter for high frequency input. Waveguide is used as the highpass filter by virtue of it's unique property of not propagating frequencies below it's cutoff frequency. The waveguide cutoff frequency is determined only by the dimensions of the waveguide. Thus the highpass filter can be made from a short length of waveguide line.

This two channel band line coupler can be used to couple two different channel transmitters to a common transmission line and so provide a method and structure of adding an HDTV station (with it's associated UHF antenna and transmitter) to an existing VHF NTSC or FM coaxial transmission line and antenna system. This solution reduces additional wind and weight loading on the existing tower.

Figure 1:
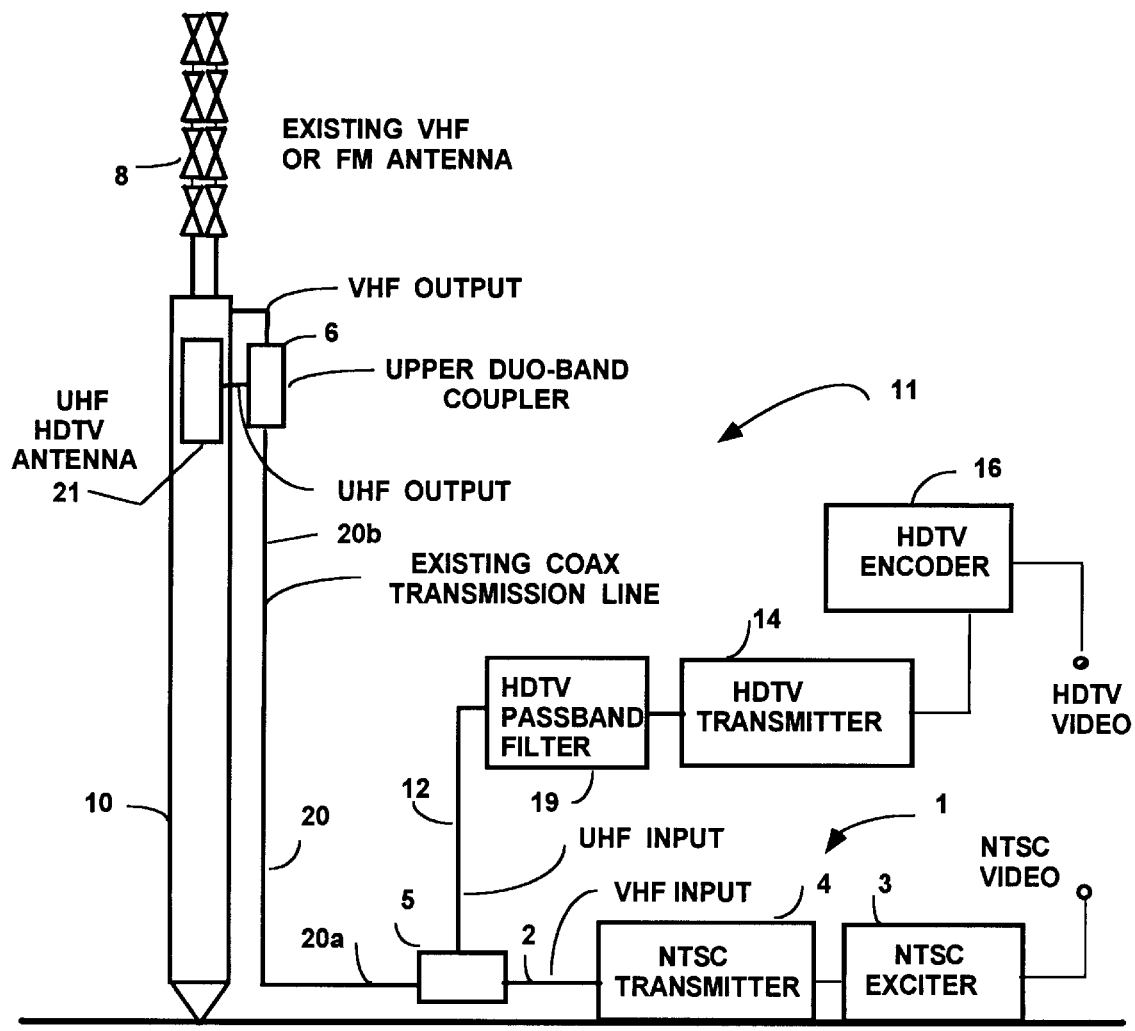
FIG. 1 illustrates the first embodiment including structures of separate HDTV and NTSC transmitters feeding full service HDTV and NTSC broadcast antennas on a tower, via a common transmission line with channel band line couplers at both ends of the transmission line, according to the present invention.

As shown in FIG. 1, the NTSC RF signal from the NTSC transmitter system 1 in line 2 is fed to coaxial transmission line 20 at the transmitter end 20a thereof by means of two channel coupler 5 and removed and separated at the antenna end 20b thereof by two channel separator 6. The NTSC transmitter system 1 includes: the NTSC exciter 3, which responds to the NTSC channel video and audio signals; and the NTSC transmitter 4, which includes an up converter and power amplifier (not shown). The transmission line 20 is an all-band coaxial line and is carried by tower 10 to the NTSC antenna 8 on top of the tower. This is usually all part of the existing station NTSC broadcast system.

Figure 10:
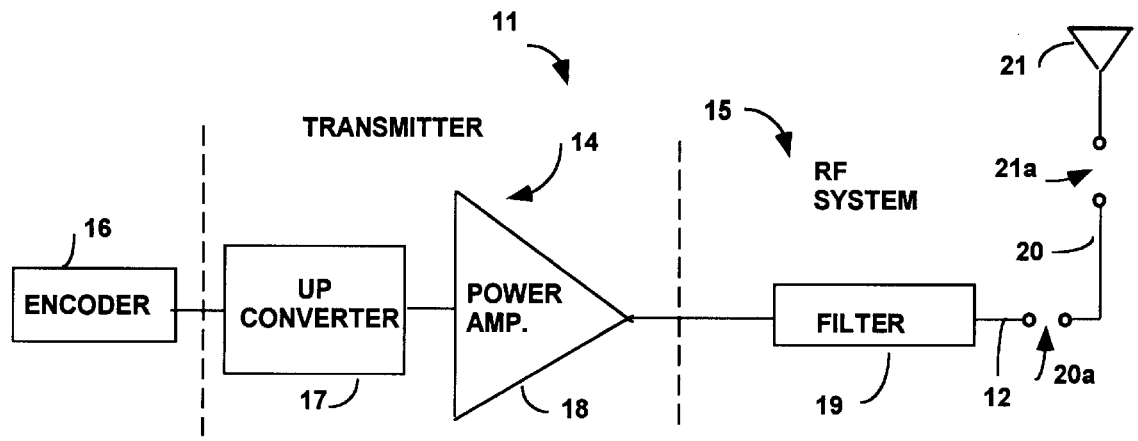
FIG. 10 is a block diagram of a typical HDTV broadcast transmission system that has been proposed.

As also shown in FIG. 1, the HDTV RF signal from the HDTV transmitter system 11 in line 12 is also fed to coaxial transmission line 20 at the transmitting end 20a thereof by means of two channel line combiner 5 and removed and separated at the antenna end 20b thereof by two channel line separator 6 and fed to HDTV antenna 21, which is a side mounted or wrap-around panel antenna, below the NTSC antenna. The HDTV transmitter system 11, shown in more detail in FIG. 10, includes: an encoder 16, which responds to the HDTV channel video and audio signals; a transmitter 14, which includes up converter 17 and power amplifier 18; and absorptive passband filter 19. All of this is the HDTV broadcast system that is added to the existing station NTSC broadcast system.

Turning next to FIGS. 2 and 3, there is shown in FIG. 2, a side view of the two channel line couplers 5 and 6 and the common NTSC and HDTV RF transmission line 20 showing details of the couplers, and in FIG. 3, a top view of one of the couplers. Each of the couplers 5 and 6 consists of two filters 32 and 36 whose outputs are joined together at a common junction 34, which feeds transmission line 20. The filters are designed so that they separate the HDTV RF and NTSC RF frequency bands without the use of highly tuned components, unlike diplexers. The filters are selected to operate over a broad range of frequencies. The NTSC channel band filter 32 passes low frequencies and rejects high frequencies, and thus is a lowpass filter. The HDTV channel filter 36 passes high frequencies and rejects lower frequencies, and thus is a highpass filter. When combined at junction 34 with the proper lengths of line in between, high levels of isolation can be maintained between the HDTV and NTSC inputs.

The filters 32 and 36 can be of various designs as long as their characteristics are lowpass and highpass, respectively. For example the NTSC filter 32 may be a section of stepped impedance coaxial line as a lowpass filter for VHF (where the NTSC RF is in the VHFV band); and the HDTV filter 36 may be a lumped element highpass filter or a short section of waveguide, which functions as a highpass filter for UHF (where the HDTV RF is in the UHF band). Waveguide is used as the highpass filter due to it's unique property of not propagating frequencies below a certain cutoff frequency. The waveguide cutoff frequency is determined only by the dimensions of the waveguide. Thus, a highpass filter can be made from a short length of waveguide line other tuned elements are not needed.

Waveguide As A Highpass Filter

The number of possible modes increases with frequency for a given size waveguide. There is only one possible mode (called the dominant mode) for the lowest frequency that can be transmitted. The dominant mode is the one normally used.

In a rectangular waveguide the critical dimension is the width (X or B herein), which must be more than one-half wavelength (λ) at the lowest frequency to be transmitted. In practice, the waveguide height (Y herein), usually is made about equal to ½X to avoid the possibility of operation at other than the dominant mode. Other cross-section shapes than the rectangle can be used, the most important being the circular waveguide. Many of the same considerations apply as in the rectangular waveguide. Wavelength formulas for rectangular and circular guides are given in Table 1, where X is the width of a rectangular guide and R is the radius of a circular guide. All figures are in terms of the dominant mode.

Energy may be introduced into or extracted from a waveguide or resonator by means of either the electric or magnetic field. When energy transfer is through a coaxial line, electric field coupling can be by a probe that is simply a short extension of the inner conductor of the coaxial line, oriented so it is parallel to the electric lines of force. Magnetic field coupling can be done by a loop that encloses some of the magnetic lines of force and the loop can be an extension of the inner conductor of the coaxial line. The point at which maximum coupling is obtained depends on the particular mode of propagation in the guide or cavity and the coupling will be maximum when the coupling device is in the most intense field. Coupling can be varied by rotating the probe or loop through 90 degrees.

As shown in FIGS. 2, 3, 5 and 6, the two channel band line coupler 5 for high VHF NTSC Channels 7 to 13 and for radio FM (also referred to herein as Hi-V) combined with HDTV RF consists of lowpass filter 32 and highpass filter 36 joined at coaxial T connector 34 that feeds the coaxial transmission line 20 (see FIG. 2).

The similar coupler for VHF NTSC Channels 2 to 6 (also referred to herein as Lo-V) combined with HDTV RF is shown in FIG. 4, and consists of lowpass filter 132 and highpass filter 136 joined at coaxial T connector 134 that feeds the coaxial transmission line 20 at the trasmitter end 20a thereof.

The following description of lowpass filter 32 and highpass filter 36 and connections to, from and therebetween applies to both embodiments of the coupler, the Hi-V embodiment shown in FIGS. 2, 3, 5 and 6 and the Lo-V embodiment shown in FIG. 4. Tables 1 and 2 apply to both.

Lowpass Filter 32

Lowpass filter 32 is referred to herein also as the NTSC RF or FM RF filter and passes RF in the VHF band (30 MHz to 300 MHZ), which includes NTSC Channels 2 to 13 and FM radio (44 MHz to 108 MHz), but does not pass RF signals in the UHF band (300 MHz to 3000 MHz).

Filter 32 may be any type of lowpass filter. For example it may be a Chebyshev; type lowpass filter as shown in FIGS. 5 and 6, it may consist of a coaxial line section of outer conductor 52, inner conductor 54 and spaced capacitive elements 56 between the conductors see FIGS. 5 and 6. The length of this lowpass filter section from the input to the center of the T connector 34 is Dimension C shown in FIG. 5. The length of this lowpass filter section from the input to the output of the T connector 34 is Dimension D shown in FIG. 5. At the input of the filter, the outer and center conductors 52 and 54 couple to the NTSC RF coaxial transmission line 2 by matching section 42. The filter output connects directly by coaxial T connector 34 to the trasmitter end 20a of transmtion line 20.

The dimensions C and D of lowpass filter 32 are accommodations for the lower frequency channel, the NTSC RF or the FM as follows:

(a) For the upper NTSC Channels 7 to 13, in VHF, (174 MHz to 216 MHZ], C=45.00 inches;

(b) For FM (88 MHz to 108 MHz), C=71.63 inches;

(c) For the upper NTSC Channels 7 to 13, in VHF, (174 MHz to 216 MHZ), D=51.00 inches; and (d) For FM (88 MHz to 108 MHz), D=77.63 inches;

The VHF NTSC Channels and VHF FM radio Channels and the UHF NTSC Channels are described in Table 2 below, along with dimensions of the high pass filter 36 that are accommodations for the HDTV Channel RF.

Highpass Filter 36

Highpass filtre 36 of coupler 5, shown in FIGS. 2 and 3 and sand 6, is referred to herein as the HDTV RF filter and passes RF in the UHF band including the selected HDTV Channel band. It does not pass RF signals in the VHF band that includes the station existing NTSC Channel band. It is a rectangular waveguide section cavity that has length L, width B or X and height Y. The length is preferably two or more wavelengths (λ) of the HDTV RF, which is satisfied by 52.00 inches, as the longest λ UHF Channel 14 is $\lambda_{14}$=25.13 inches. The input to this highpass filter of HDTV RF from line 12 is through matching section 44 that couples line 12 waveguide section 36 at the opposite end thereof from coaxial line 38 that feeds the HDTV RF to transmission line 20 through T section 34.

The width B or X (see FIG. 6) determines the cut-off frequency of the waveguide and so B or X is:

(a) less than half a wavelength of the VHF RF (NTSC Channels 2 to 13 or FM)—so that $\lambda_{NTSC}$ is greater than 2x; and (b) not cut-off to the UHF RF (HDTV RF or NTSC Channels 14 to 69)—so that $\lambda_{HDTV}$ is less than 1.6x.

The dimension A is selected depending on both the VHF and the UHF Channels that are combined for broadcast. It is the length of the coaxial line section 8 consisting of inner conductor 58 and outer conductor 62, from the T connector 34 to the rectangular waveguide 36. That section offers high impedance to the VHF and low impedance to UHF.

Table 2 lists combinations of UHF TV Channels and VHF TV Channels and FM and for the various combinations, the recommended dimensions A, B or X, approximate wind area and approximate weight of the coupler 5 or 6. This table serves as a guide for designing the coupler to suit the Channels being combined for broadcast.

Coupler For VHF NTSC Channels 2 to 6 (Lo-V)

The preferred configuration of the coupler where the NTSC is one of the Lo-V VHF Channels 2 to 6 (54 MHZ to 88 MHz) is shown in FIG. 4.

The dimensions E and F shown in FIG. 4, of the Lo-V lowpass filter 132 are accommodations for the lower frequency channel, the Channels 2 to 6 NTSC RF as follows:

(a) E=77.50 inches; and (b) F=91.00 inches.

These Lo-V VHF NTSC Channels are described in Table 2 below, along with dimensions X or B and Y of the high pass filter 136 and dimension A of the coupling between the filters 132 and 136, via coaxial line 138. The input to this coupler of NTSC RF from line 2 is through matching section 142 and the input of HDTV RF from line 12 is through matching section 144.

TABLE 1

Approximate Wavelength Formulas For Waveguide

| | Rectangular | Circular |
|---|---|---|
| Cut-off wavelength | 2 X | 3.41 R |
| Longest wavelength transmitted with little attenuation | 1.6 X | 3.2 R |
| Shortest wavelength before next mode becomes possible | 1.1 X | 2.8 R |

TABLE 2

| Channels UHF | Channels VHF/FM | A inches | B or X inches | Wind Area sq. inches | Weight lbs. |
|---|---|---|---|---|---|
| 14–17 | 2–6 | 23.75 | 20.50 | 938 | 235 |
|  | 7–13 | 21.13 |  |  | 150 |
|  | FM | 34.50 |  |  | 155 |
| 18–42 | 2–6 | 23.0 | 17.50 | 780 | 225 |
|  | 7–13 | 20.38 |  |  | 145 |
|  | FM | 33.75 |  |  | 150 |
| 43–69 | 2–6 | 25.0 | 14.00 | 598 | 215 |
|  | 7–13 | 22.38 |  |  | 140 |
|  | FM | 35.75 |  |  | 145 |

TABLE 3

| NTSC TV Channels | Frequency MHz | Wavelength ($\lambda$) In. |
|---|---|---|
| 2 through 6 | 54 to 88 | 218.7 to 134.2 |
| 7 through 13 | 174 to 216 | 67.9 to 54.7 |
| 14 through 17 | 470 to 494 | 25.13 to 23.91 |
| 18 through 42 | 494 to 644 | 23.91 to 18.34 |
| 43 through 69 | 644–806 | 18.34 to 14.65 |
| FM Channels | 88 to 108 | 134.2 to 109.36 |

FIGS. 7 and 8 illustrate an alternate structure of coupler 5. This alternate structure is essentially the same as the structure shown in FIGS. 5 and 6, except that a section of circular waveguide 76 is used for the highpass filter rectangular waveguide section 36.

SECOND EMBODIMENT

Combining With Diplexer Protected By Circulator

In a TV broadcast transmission system where the NTSC RF power and the HDTV RF power are combined, a high power isolator can accomplish the following:

Impedance stabilization for HDTV;

Ghost Elimination;

Hot Switching Harmonic Rejection;

High Power Handling; and Low Loss.

Figure 9:
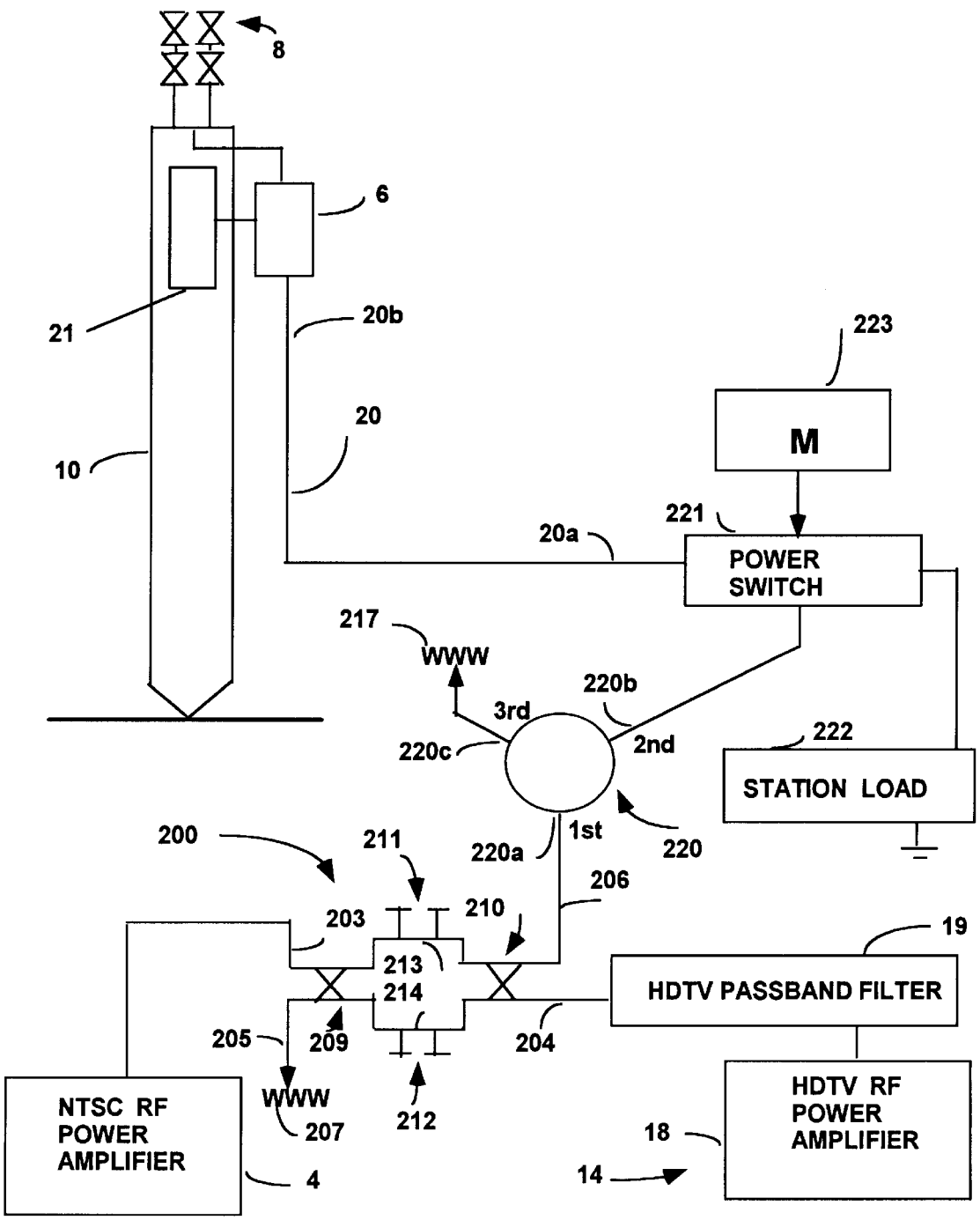
FIG. 9 illustrates the second embodiment including structures of separate HDTV and NTSC transmitters feeding full service HDTV and NTSC broadcast antennas on a tower, via a common transmission line, with a hybrid diplexer and high power three port circulator at the input end of the transmission line and a two channel band line coupler separator at the output end of the transmission line according to a second embodiment of the present invention.

The applicant is co-inventor of a high power RF circulator shown as part of this second embodiment of the present invention in FIG. 9. That circulator, described in U.S. Pat. No. 4,717,895 issued Jan. 5, 1988, entitled "High Frequency, High Power Waveguide Junction Circulator" can be used to accomplishes all of the above and protects the transmitters from reflections that degrade video performance.

Several uses of that circulator in a combined NTSC and HDTV broadcasting system, are described in U.S. Pat. No. 5,291,290, issued Mar. 1, 1994, entitled "High Power RF Broadcast Transmission System With Ferrite Circulator, in which the applicant is also a co-inventor.

The circulator provides a constant impedance to the transmitters, regardless of the system load impedance. It protects the transmission systems high power amplifier from large impedance changes, including catastrophic short circuit and lightning hit changes. The high isolation stabilizes varying impedance and reduces inter-carrier phase distortion. Reflections from the antennas (ghosts) are totally absorbed in the circulator station load port.

As shown in FIGS. 9, the output of NTSC RF power amplifier 4 is fed to input 203 of diplexer 200 and the output of HDTV RF power amplifier 18 from HDTV passband filter 19 is fed to the other input port 204 of the diplexer. The purpose of diplexer 200 is to combine the NTSC RF and HDTV RF in the diplexer output port 206 with little or no loss and no reflections back into the respective RF power amplifiers. The other output port 205 of the diplexer terminates in non-reflecting station load 207.

The diplexer includes four port hybrid coupler 209, four port hybrid coupler 210 and tuned circuits 211 and 212 in the lines 213 and 214, respectively, coupling the couplers. The NTSC RF signal from 4 is the higher RF power and sometimes referred to as the "through signal", and the HDTV RF signal from 18 through 19 is the lower power and sometimes referred to as the "injected signal". For construction and operation of such a diplexer, also see the above mentioned U.S. Pat. No. 4,240,155.

In FIG. 9, the NTSC broadcast antenna 8 is on top of tower 10 and fed by transmission line 20 to antenna 8. This is usually part of the station existing NTSC broadcast transmission system. The HDTV antenna 21 is a multi-element wrap-around type mounted on the tower below NTSC antenna 8. Both antennas are fed by the common transmission line 20 and are separated therefrom by the upper two channel band line separator 6, which is described hereinabove with reference to FIGS. 1 to 6.

The transmission line 20 may be over 1000 feet long, giving rise to reflections, imbalances and other problems. Many of those problems are reduced or eliminated by connecting a high power temperature stabilized, three port, Y-junction ferrite circulator 220 between diplexer output port 206 and the antenna transmission line 20. Such a circulator introduces negligible, or tolerable, loss and shunts substantially all reflected power from the transmission line into non-reflecting station absorbing load 217.

Circulator 220 is a high power isolator that reduces or eliminates many of the problems that are exacerbated in high power combined HDTV and NTSC broadcasting. Those problems include:

Stabilizing the impedance,

Reducing inter-carrier distortion,

Reducing inter-mode products generated in the transmitters and

Eliminating ghosts.

As mentioned above, small impedance changes can result in large changes in power output of RF power amplifiers. A high power isolator like circulator 220 provides a constant impedance to the RF generator with isolation levels of 30 dB or greater. It also protects the NTSC and HDTV RF power amplifiers from even the large impedance changes, including catastrophic change due to short circuits and lightning hits. The isolation is sufficiently high to stabilize varying impedances and reduce inter-carrier phase distortion. Reflection from the antenna (ghosts) are totally absorbed by non-reflective load 217 that is coupled to the third port of the circulator.

Circulator 220 absorbs other frequencies flowing from transmission 20 that may be from the antennas or from other sources. These frequencies can be coupled back into the power amplifiers creating inter-mode products therein which would then be transmitted along with the main signal.

As described in said U.S. Pat. No. 5,291,290 and shown herein in FIG. 9, the circulator can also be used as a "hot switch". A remotely controlled tuner on the output of the circulator allows RF power to be switched from the antenna to the station load, without requiring that the transmitter be shut-down. Conventionally, the output switch on all transmitters is either a patch panel or a motorized switch. In either case the transmitter must be shut down before switching can take place and that requires the use of remote controls and various answer back commands to insure that the motorized switch has been fully engaged before transmitter power can be reapplied. With the addition of remotely controlled power switch 221 on the output of the circulator, the RF power can be switched from antenna transmission line 20 to station load 222 without shutting down the transmitter. Power switch 221 is controlled by motor 223.

The circulator is a three port device. Electromagnetic waves of combined NTSC and HDTV RF from diplexer 200 entering at port 220a come out at port 220b; waves entering at port 220b come out at port 220c; and waves entering at port 220c come out at port 220a. Furthermore, all of these couplings between ports are non-reciprocal so that port 220a is isolated from waves entering port 220b, port 220b is isolated from waves entering port 220c and port 220c is isolated from waves entering port 220a. This unique property of circulating the waves around as described makes the circulator an ideal device for matching, isolating and switching.

The circulator's performance depends on the ferrite materials saturation magnetization and the intensity of the biasing magnetic field as explained in the above mentioned U.S. Pat. No. 5,128,635. Briefly, the saturation magnetization of ferrites is temperature dependent and is influenced by:

Cooling temperature;

Heating due to RF losses. i.e., RF power level; and

Ambient temperature Performance of this circulator is stabilized with a self-contained, closed loop cooling and heating system. The system regulates the elevated ferrite temperature regardless of ambient temperature, input power and reflected power.

Arrangements of HDTV and NTSC Antennas

Figure 12:
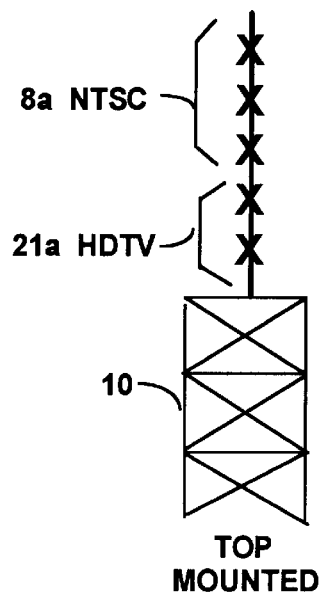
FIG. 12 illustrates structures of separate HDTV and NTSC broadcast antennas, both top mounted on the tower.
Figure 13:
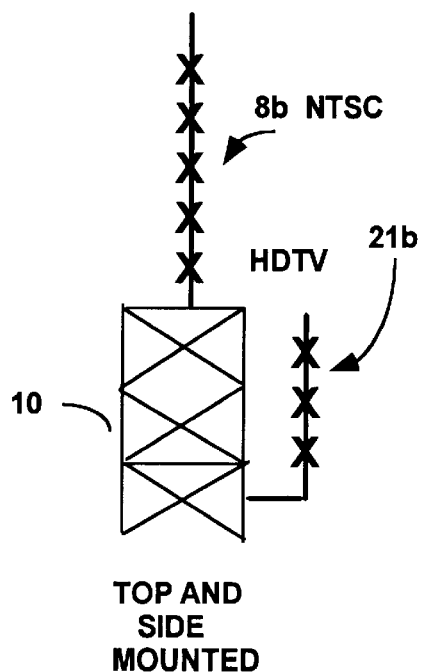
FIG. 13 illustrates other structures of separate HDTV and NTSC broadcast antennas of which the NTSC antenna is top mounted and the HDTV antenna is side mounted (not Wrap Around)
Figure 14:
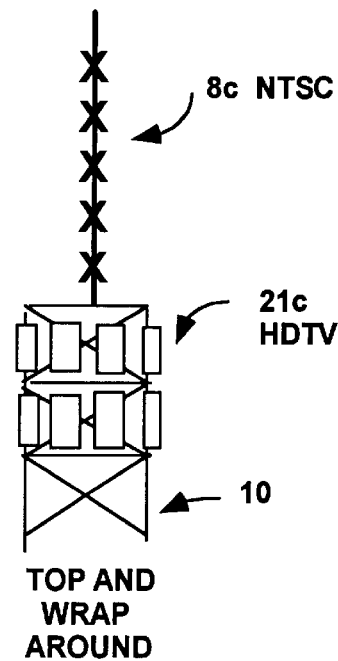
FIG. 14 illustrates still other structures of separate HDTV and NTSC broadcast antennas of which the NTSC antenna is top mounted and the HDTV antenna is a wrap around antenna.

An antenna can be either top mounted or side mounted on a tower. FIG. 12 shows top mounted HDTV and NTSC antennas, with the NTSC antenne 8a on top of the HDTV antenne 21a on top of the tower 10. FIG. 13 shows a top mounted NTSC antenna 8b and a side mounted HDTV antenna 21b on the tower. FIG. 14 shows a top mounted NTSC antenna 8c and a side mounted, multi-element, wrap-around HDTV antenna 21c on the tower. Any NTSC station considering adding HDTV service should consider the alternatives described in said abandoned U.S. patent application Ser. No. 07/956,911.

SUMMATION

While the inventions described herein are described in connection with several preferred embodiments of each invention, it will be understood that it is not intended to limit the inventions to those embodiments. It is intended to cover all alternatives, modifications, equivalents and variations of those embodiments and their features as may be made by those skilled in the art within the spirit and scope of the inventions as defined by the appended claims.

I claim:

1. Combined NTSC and HDTV broadcast systems, the NTSC system producing an NTSC Channel band herein called $RF_{NTSC}$ and said HDTV system producing an HDTV Channel band herein called $RF_{HDTV}$, the NTSC system including an NTSC transmitter system and NTSC broadcast antenna, the HDTV system including an HDTV transmitter system and HDTV broadcast antenna, and both of said antennas carried at the top of a common support tower, comprising, (a) a transmission line having a transmitter end at the bottom of said support tower and an antenna end at the top of said support tower, (b) means at the bottom of said support tower for combining said $RF_{NTSC}$ and said $RF_{HDTV}$ from said first and second transmitter systems, respectively, and feeding said combined $RF_{NTSC}$ and $RF_{HDTV}$ to said transmitter end of said transmission line, whereby said transmission line conducts said $RF_{NTSC}$ and said $RF_{HDTV}$ to said antenna end thereof and (c) means at the top of said support tower for separating said $RF_{NTSC}$ and said $RF_{HDTV}$ conducted in said antenna end of said transmission line and feeding said $RF_{NTSC}$ to said NTSC antenna and feeding said $RF_{HDTV}$ to said HDTV antenna, (d) said means for separating is a two band coupled line device including an $RF_{NTSC}$ lowpass filter and an $RF_{HDTV}$ highpass filter, both connected to said antenna end of said transmission line, (e) said lowpass filter feeds said first antenna, (f) said highpass filter feeds said second antenna and (g) said highpass filter is a waveguide for which the waveguide cut-off frequency is above said $RF_{NTSC}$ and below said $RF_{HDTV}$, (h) whereby said NTSC antenna broadcasts said $RF_{NTSC}$ and said HDTV antenna broadcasts said $RF_{HDTV}$.

2. First and second broadcast transmission systems each producing RF signals in different VHF and UHF bands, referred to herein as $RF_{VHF}$ and $RF_{UHF}$, the first system including a first transmitter system and first broadcast antenna, the second system including a second transmitter system and second broadcast antenna, and both of said antennas carried at the top of a common support tower, comprising, (a) a transmission line having a transmitter end at the bottom of said support tower and an antenna end at the top of said support tower, (b) means at the bottom of said support tower for combining said $RF_{VHF}$ and said $RF_{UHF}$ from said first and second transmitter systems, respectively, and feeding said combined $RF_{VHF}$ and $RF_{UHF}$ to said transmitter end of said transmission line, whereby said transmission line conducts said $RF_{VHF}$ and $RF_{UHF}$ to said antenna end thereof and (c) means at the top of said support tower for separating said $RF_{VHF}$ and said $RF_{UHF}$ conducted in said antenna end of said transmission line and feeding said $RF_{VHF}$ to said first antenna and feeding said $RF_{UHF}$ to said second antenna, (d) said means for separating is a two band coupled line device including an $RF_{VHF}$ lowpass filter and an $RF_{UHF}$ highpass filter, both connected to said antenna end of said transmission line, (e) said lowpass filter feeds said first antenna, (f) said highpass filter feeds said second antenna and (g) said highpass filter is a waveguide for which the waveguide cut-off frequency is above said $RF_{VHF}$ and below said $RF_{UHF}$ (h) whereby said first antenna broadcasts said $RF_{VHF}$ and said second antenna broadcasts said $RF_{UHF}$.

3. First and second broadcast transmission systems producing RF signals in different frequency bands, referred to herein as $RF_{LOW}$ and $RF_{HIGH}$, the first system including a first transmitter system and first broadcast antenna, the second system including a second transmitter system and second broadcast antenna, and both of said antennas carried on a common support tower, comprising, (a) a transmission line having a transmitter end at the bottom of said support tower and an antenna end at the top of said support tower, (b) means at the bottom of said support tower for combining said $RF_{LOW}$ and said $RF_{HIGH}$ from said first and second transmitter systems, respectively, and feeding said combined $RF_{LOW}$ and $RF_{HIGH}$ to said transmitter end of said transmission line, whereby said transmission line conducts said $RF_{LOW}$ and said $RF_{HIGH}$ to said antenna end thereof and (c) means at the top of said support tower for separating said $RF_{LOW}$ and said $RF_{HIGH}$ conducted in said antenna end of said transmission line and feeding said $RF_{LOW}$ to said first antenna and feeding said $RF_{HIGH}$ to said second antenna (d) said means for separating is a two band coupled line device including an $RF_{LOW}$ lowpass filter and an $RF_{HIGH}$ highpass filter, both connected to said antenna end of said transmission line, (e) said lowpass filter feeds said first antenna, (f) said highpass filter feeds said second antenna, and (g) said highpass filter is a waveguide for which the waveguide cut-off frequency is above said $RF_{LOW}$ and below said $RF_{HIGH}$, (h) whereby said first antenna broadcasts said $RF_{LOW}$ and said second antenna broadcasts said $RF_{HIGH}$.

4. Broadcast transmission systems as in claim 3 wherein, (a) said means for separating is a reciprocal device.

5. Broadcast transmission systems as in claim 3 wherein, (a) said means for combining and said means for separating are respective reciprocal devices.

6. Broadcast transmission systems as in claim 3 wherein, (a) said means for combining and said means for separating are respective reciprocal devices and structurally identical.

7. Broadcast transmission systems as in claim 3 wherein, (a) said highpass filter is a section of said waveguide, (b) said lowpass filter is a coaxial line section comprised of an outer conductor, an inner conductor and spaced capacitive elements disposed between said conductors, (c) said lowpass filter coaxial line section having a length, when said $RF_{LOW}$ is in one of NTSC Channels 2 to 6, which is 71.63 inches and (d) said highpass filter waveguide section having a width, which is less than half a wavelength of $RF_{LOW}$ and not more than 1.6 times a wavelength of said $RF_{HIGH}$.

8. A broadcast transmission system as in claim 3 wherein, (a) said means for combining is a constant impedance combiner.

9. Broadcast transmission systems as in claim 3 wherein, (a) said highpass filter is a section of said waveguide.

10. Broadcast transmission systems as in claim 9 wherein, (a) said highpass filter waveguide section having a width, which is less than half a wavelength of $RF_{LOW}$ and not more than 1.6 times a wavelength of said $RF_{HIGH}$.

11. Broadcast transmission systems as in claim 3 wherein, (a) said lowpass filter is a Chebyshev-type lowpass filter.

12. Broadcast transmission systems as in claim 3 wherein, (a) said lowpass filter is a section of stepped impedance coaxial line.

13. Broadcast transmission systems as in claim 12 wherein, (a) said lowpass filter is a coaxial line section comprised of an outer conductor, an inner conductor and spaced capacitive elements disposed between said conductors.

14. Broadcast transmission systems as in claim 13 wherein, (a) said lowpass filter coaxial line section having a length, when said $RF_{LOW}$ is in one of NTSC Channels 7 to 13, which is 45.00 inches.

15. Broadcast transmission systems as in claim 13 wherein, (a) said lowpass filter coaxial line section having a length, when said $RF_{LOW}$ is in one of NTSC Channels 2 to 6, which is 71.63 inches.

16. A broadcast transmission system as in claim 3 wherein, (a) a high power circulator is electrically between said means for combining and said transmitter end of said transmission line, (b) whereby said first and second transmitter systems are isolated from reflected signals in said transmission line.

17. A broadcast transmission system as in claim 16 wherein, (a) said high power circulator includes: a junction containing magnetized ferrite material, said junction having first, second and third RF signal ports of which: RF signal flow into said first port couples readily from said second port but not from said third port, RF signal flow into said second port couples readily from said third port but not from said first port and RF signal flow into said third port couples readily from said first port but not from s aid sec ond port, (c) said combined $RF_{LOW}$ and $RF_{HIGH}$ is coupled to said circulator first port, (d) a non-reflecting RF load is coupled to said circulator third port and.

18. A broadcast transmission system as in claim 17 wherein, (a) a non-reflective station load is provided, (b) means are provided for selectively coupling said second port of said circulator between one of said input end and said transmission line and said non-reflective station load, (c) whereby RF power from said first and second transmitter systems may be switched from said transmission line and said respective antennas to said non-reflecting station load without reflected RF from such switching action flowing to said transmitter systems.

19. A broadcast transmission system as in claim 3 wherein, (a) said means for combining is a diplexer.

20. A broadcast transmission system as in claim 19 wherein, (a) said diplexer is a constant impedance combiner includes first and second four port hybrid couplers, (b) two ports of said first hybrid coupler are coupled to two ports of said second hybrid coupler by respective reject filters, (c) one port of said first hybrid coupler is fed said $RF_{LOW}$ signals, (d) one port of said second hybrid coupler is fed said $RF_{HIGH}$ signals and, (e) a remaining port of said second hybrid coupler is couple to said transmission line, (f) whereby combined $RF_{LOW}$ and $RF_{HIGH}$ signals are fed to said transmission line.

21. A broadcast transmission system as in claim 20 wherein, (a) said respective reject filters pass said $RF_{LOW}$ and reflect said $RF_{HIGH}$ signals.

22. A broadcast transmission system as in claim 21 wherein, (a) a remaining port of said first hybrid coupler is coupled to a non-reflective load, (f) whereby reflections of RF signals in said transmission line are absorbed by said load.

* * * * *